United States Patent [19]
Harck et al.

[11] Patent Number: 5,310,160
[45] Date of Patent: May 10, 1994

[54] ELECTROMAGNETIC VALVE TOP PART

[75] Inventors: Kurt Harck, Sonderborg; John G. Abrahamsen; Holger Nicolaisen, both of Nordborg; Michael Boisen, Kolding; Erik Kyster, Sonderborg, all of Denmark

[73] Assignee: Danfoss A/S, Nordborg, Denmark

[21] Appl. No.: 4,512

[22] Filed: Jan. 14, 1993

[30] Foreign Application Priority Data

Jan. 21, 1992 [DE] Fed. Rep. of Germany ....... 4201449

[51] Int. Cl.⁵ .............................................. F16K 31/06
[52] U.S. Cl. ................................. 251/129.15; 137/269
[58] Field of Search ...................... 251/129.18, 129.15; 137/269

[56] References Cited

U.S. PATENT DOCUMENTS

| | | | |
|---|---|---|---|
| 3,633,869 | 1/1972 | Lehmann | 251/129.18 |
| 3,712,581 | 1/1973 | Parlow | 251/129.15 |
| 4,437,488 | 3/1984 | Taggart et al. | 251/129.18 X |

FOREIGN PATENT DOCUMENTS 0110139 6/1984 European Pat. Off. .

*Primary Examiner*—Arnold Rosenthal
*Attorney, Agent, or Firm*—Wayne B. Easton

[57] ABSTRACT

An electromagnetic valve assembly having upper and lower modules. A standardized lower module can be joined with one of several upper modules having a different axial length for varying the magnetic field strength of a coil arrangement in the upper module without changing the length or position of an armature tube in the lower module.

2 Claims, 1 Drawing Sheet

U.S. Patent  May 10, 1994  5,310,160
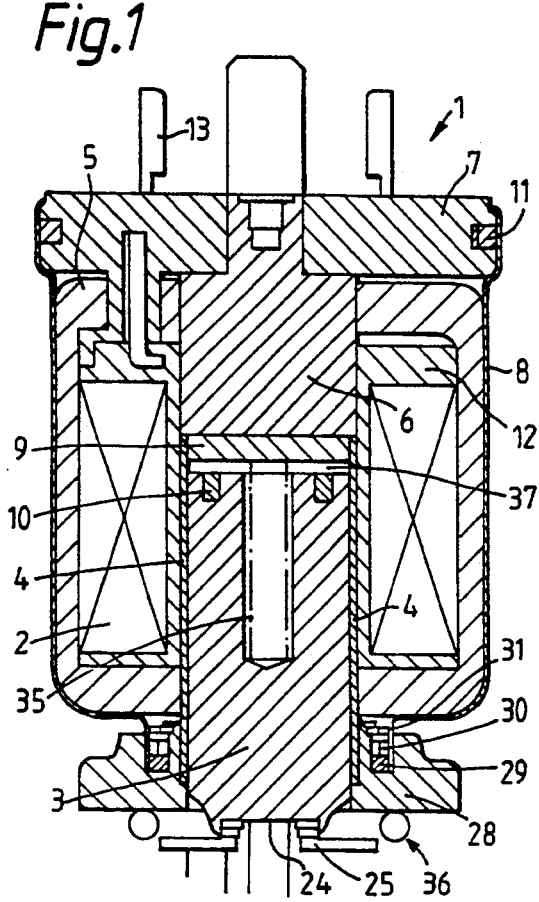
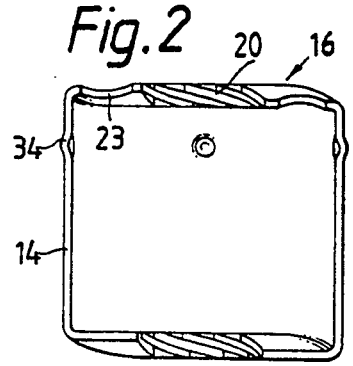
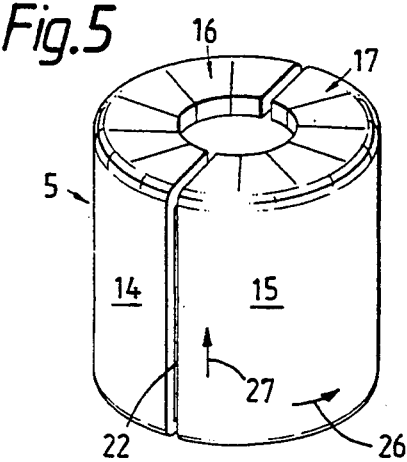
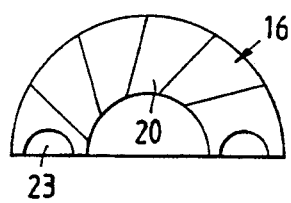
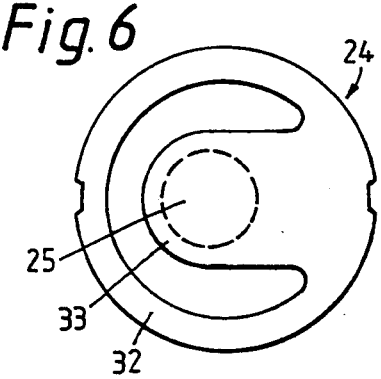
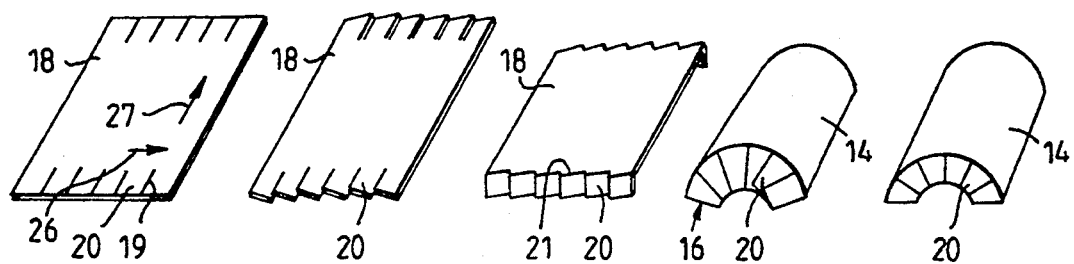

ELECTROMAGNETIC VALVE TOP PART

The invention relates to an electromagnetic valve top part with a coil arrangement, an armature, which carries a closure member and which is movably arranged in an armature tube which on one side projects into a coil arrangement, a yoke fitting the coil arrangement and which surrounds the coil arrangement, a core head, which on the other side projects into the coil arrangement and is fixed there, and a base part for mounting the electromagnetic valve top part on a bottom part.

An electromagnetic valve top part of that kind is known from DE 32 40 103 A1.

Depending on the purpose of application and usage, different demands are made of electromagnetic valves. For example, individual electromagnetic valves differ in the force with which they are able to open and close. Another distinguishing feature is their operational speed, that is, the speed with which the armature can be moved. Other examples include current consumption, load rating or similar attributes. In simple terms, the electromagnetic valves can be classified in different performance categories.

In order to construct a valve of a higher performance category, it has so far been customary to enlarge the magnetic system radially, that is to say, the coil, the yoke and the core part. This requires, inter alia, coil members, yokes and housings of different diameters. When assembling such electromagnetic valve top parts, different performance categories therefore require different tools, which in some cases are very expensive. Moreover, it is difficult to assemble the electromagnetic valve top parts automatically, that is, the expense involved in automatic assembly is relatively high.

The invention is based on the problem of providing an electromagnetic valve top part which can be manufactured with little expense in different performance categories.

This problem is solved in an electromagnetic valve top part of the kind mentioned in the introduction in that the armature tube is of a predetermined standard length irrespective of the performance category of the valve and is fixedly connected to the base part, and the coil arrangement is exchangeable for a different coil arrangement with a different axial length depending on the performance category of the valve, the core head having a length suited to the axial length of the coil arrangement and leaving a predetermined constant space free for the armature tube irrespective of the axial length of the coil arrangement.

With that arrangement the difference in the performance category is achieved by a change in the axial length of the coil arrangement. That has previously led to problems, because the axial length of the armature and of the armature tube also had to be altered. That is now avoided. The armature and the armature tube can be of the same construction for all performance categories. Nevertheless, on assembling the electromagnetic valve top part the same air gap is always formed between the armature and the core head and thus the behavior is always the same, because the variation in the axial length of the coil arrangement also leads to a variation in the axial length of the core body. With a longer coil arrangement, the core head also projects further into the coil arrangement. The space remaining free for the armature tube and the armature remains the same, regardless of the performance category of the valve. The electromagnetic valve top part is therefore, as it were, divided into a power part, the axial length of which is variable, and a movement part of constant length, which is formed by the armature and the armature tube surrounding it and also the base part. The movement part can remain the same for all performance categories. That allows a highly efficient manufacture, since fewer different parts need to be kept in stock. In addition, the same tool can be used for holding the base part with the armature tube and the armature. Because the power part, that is, the coil arrangement with yoke and core head, also always has the same radial external dimension, the same tool can also always be used for taking hold of these parts. Only the axial movement of the tool requires to be controlled, depending on the performance category.

Preferably, on the end face remote from the armature there is arranged a terminal plate for leading out electrical connections of the coil arrangement, wherein the terminal plate is secured in a housing surrounding the yoke and holds the core head. Irrespective of the axial length, the electrical connections for the coil arrangement are also arranged always at the same radial location, so that no further adjustment of the axial length of the coil arrangement needs to be made. Because the terminal plate holds the core head, the core head is reliably secured in the housing independently of the axial length of the coil arrangement.

To simplify manufacture, it is preferable for the terminal plate to be of a standard size, regardless of the performance category of the valve. This also reduces the requirement for stock-keeping and enables fewer tools to be used.

Preferably, the electromagnetic valve top part is assembled from two modules, of which one is formed essentially by the armature tube with the armature and the base part, and the other part is formed essentially by the coil arrangement, the yoke, the core head, the terminal plate and the housing, the housing being arranged to be fixed in the base part. Both modules can be manufactured separately. one of the modules is identical for all performance categories. The other module with the coil arrangement is manufactured in dependence on the desired performance category. If an electromagnetic valve top part of a specific performance category is required, the corresponding coil arrangement module is selected and is combined with a standard module which is of identical construction for all performance categories.

The yoke preferably closely surrounds the coil arrangement at least radially, and at its ends has apertures which exactly fit the armature tube and the core head. Because the radial dimensions for the valves of all performance categories are the same, somewhat greater expense can be expended here to match the corresponding inner dimension of the yoke or the size of the apertures exactly to the corresponding outer dimension of the armature tube, or core head, or of the coil arrangement. That means that there are relatively few air gaps in the magnetic path, which is formed through the yoke, the core head and the armature, so that a relatively good yield of magnetic power, that is, good efficiency, can be achieved. Nevertheless, in principle just one tool is required for all performance categories, since, as already mentioned, the radial dimensions are the same in all cases.

Preferably, the yoke is of cylindrical construction and surrounds the coil arrangement, which is likewise cylindrical, around its entire circumference. The magnetic flux can therefore have a closed path on the entire circumference of the coil arrangement. A relatively large region with really good magnetic conductivity is therefore made available, so that in the air gap between the core head and the armature a high field strength is able to form, which in turn leads to a higher force on the armature. In other words, with the same force a smaller electromagnetic valve top part can be used. The expense is here reduced for each performance category.

Advantageously, the core head, the housing, the armature, the armature tube and the base part are also of substantially rotationally symmetrical construction. They are therefore cylinder-like bodies. They can be arranged in a line one behind the other, thus allowing automatic assembly in production.

Advantageously, the yoke is formed from thin "dynamo"[1] sheet. "Dynamo" sheet is relatively inexpensive. It has a relatively high magnetic permeability combined at the same time with low electrical conductivity. Since a relatively large cross-section is available to the yoke for the magnetic flux by virtue of the structural configuration, a thinner sheet can be used because a part of this advantageous effect can be relinquished. That spares further expense.

[1] Presumably magnetic sheet steel - translator.

In an especially preferred embodiment, the yoke is formed from several, in particular two, circumferential portions of a cylinder with associated partial end faces, which portions at their longitudinal sides enclose substantially axially extending air gaps. The assembly of such a yoke is very simple. The corresponding circumferential portions of a cylinder need only to be positioned around the coil arrangement. With two circumferential portions, which are constructed as half-shells of a cylinder, only a few supporting points are required for holding. The circumferential portions provide a flux path extending in the direction of the magnetic field for the magnetic field. At the same time, however, the axially extending air gaps largely prevent the propagation of eddy currents in the yoke. At the very least, the eddy currents are unable to form in the circumferential direction. This avoids undue heating and the attendant losses.

It is preferable for the circumferential portions to be bent from plate-like blanks, the end faces being formed at each axial end by border region portions bent along a bending line and separated from one another by lines of separation which before the unwinding[2] run substantially axially. For different performance categories the plate-like blanks are merely required to be of different axial lengths. The other dimensions can remain the same. This also means that the same tools can be used for bending over the border region portions. When the blanks have been bent, and once the border region portions have been bent over, the border region portions come to lie one on top of the other, which in the middle of the resulting end faces leads to a thickening of material. Since, however, in this portion the magnetic field strength is also at its greatest, that effect is desirable, since a correspondingly larger line cross-section is available for the larger field strength. The occurrence of a saturation effect here, which would lead to a reduction in the magnetic permeability and therewith to an increase in the magnetic resistance in the yoke, is therefore avoided.

[2] Presumably "Abwickeln" (unwinding, uncoiling) is in error for "Abwinkeln" (bending); cf. claim 10 - translator.

Advantageously, the bending line runs at a predetermined angle to the circumferential direction. The individual border region portions then no longer lie in one plane after the bending, but in many parallel planes, which are inclined to the plane that forms with the plane of the blank a straight line that points in the circumferential direction. When the blank is bent, the individual border region portions are able to slide over one another with ease. Snagging of the border region portions against one anther, which could lead to impairment of the bending operation or to the individual border region portions being incorrectly bent, does not occur. When the angle is correctly chosen, for example, when the beginning of a bending line of one border region portion is displaced relative to the end of the bending line of a neighboring border region portion by, for instance, the material thickness of the blank, the individual border region portions come to lie freely one on top of the other. Unnecessary air gaps between the individual border region portions are thereby avoided, with the result that good permeability is ensured.

The plate-like blanks can also be formed from several layers of dynamo sheet, especially layers that are electrically isolated from one another. This produces an increase in the cross-section available for the conducting of the magnetic field, but prevents the formation of eddy currents which in particular when the individual layers are isolated electrically form one another, are able to form only within the respective layers.

In a further preferred embodiment, provision is made for pimple-like projections which lie against the housing to be provided on the outside of the yoke. By that means it is possible to produce a clamping force between the yoke and the armature tube, or the core head, which leads to a further reduction in the air gaps and other tolerances, in particular when attaching the yoke to the armature tube and to the core head.

Advantageously, the armature tube is closed by a cover disc made of a material with a substantially higher permeability than air. This material has therefore a higher "permeability". This corresponds approximately to the conductivity of the yoke or the armature. The cover disc serves to seal the armature tube. It also serves, however to equalize differences in the travel arising from tolerances. The cover disc should be introduced into the armature tube to a depth such that it closes flush with the upper edge of the armature tube. Alternatively, it may protrude above the armature tube. It should be selected so that the travel of the armature is as small as possible yet sufficient. With relatively large initial air gaps, the initial opening force of the armature is less.

In order to be able to achieve this equalization in an especially simple manner, in a preferred embodiment provision is made for the cover disc to be movable in the armature tube prior to assembly of the electromagnetic valve top part, and to be fixed in the armature tube by a connection produced after the assembly. This connection can be produced, for example by welding, in particular by laser welding. In that case, an identical tensile force for all valves of the same performance category is achieved.

To decrease the opening force of a valve, which is closed in the rest position, provision is made for the closure member to comprise a circular ring-shaped plate, from which a resilient tongue projects inwards.

The resilient tongue then comes into engagement with the valve seat, if desired via the intermediary of a sealing layer. At the start of the opening process of such a valve, the force acting on the armature is relatively small owing to the air gap that is still large. On the other hand, suction forces that are in some cases considerable act on the closure member and result in the resistance to movement of the closure member being greater than in an already opened valve. The construction with the resilient tongue means that the armature can be moved without having to open the valve. After a certain travel, the armature has, however, already absorbed a certain kinetic energy. In addition, the magnetic force acting on the armature has increased. Because the tensile force on the tongue acts at a region that lies outside the valve seat, with the "impulse" of the armature and the now enlarged magnetic field it is now possible for the armature to lift the tongue initially at one point. The pressure differences can be equalized by this means. Once the pressure differences have been equalized, the tongue can easily be lifted from the valve seat.

The invention is described hereinafter with reference to a preferred embodiment and in conjunction with the drawing, in which FIG. 1 shows a vertical cross-section through the electromagnetic valve assembly which includes a coil and surrounding halves of a yoke, FIG. 2 shows a side view of one of the yoke halves, FIG. 3 shows a plan view of the yoke half shown in FIG. 2, FIGS. 4(a)–4(e) shows a series of production stages in the manufacture of the yoke, FIG. 5 shows a perspective view of a completed yoke, and FIG. 6 shows a plan view of the closure valve member shown in FIG. 1.

An electromagnetic valve top part 1 comprises a coil arrangement consisting of a coil 2 and a shaped body 12, into which an armature 3 is introduced from one end; the armature is mounted so as to be axially movable in an armature tube 4. A yoke 5 surrounds the coil 2 in the manner of a cylinder with end faces. A core head 6 is introduced into the coil 2 from the other end. The core head 6 projects so far into the coil 2 that it rests on the armature tube 4 or on a cover disc 9 arranged therein. The core head 6 is held by a terminal plate 7 which in turn is secured in a housing 8. To form a seal, an O-ring 11 is arranged between the terminal plate 7 and the housing 8. The armature tube 4 is closed by the cover disc 9. The armature 3 has a damper winding 10 at its end facing the cover disc 9. Electrical connections 13, through which the coil 2 is supplied with electrical energy, are guided through the terminal plate 7. In the non-energized state, the armature 3 is brought by a return spring 35 into the position illustrated, in which a closure member 24 arranged at the end of the armature 3 projecting from the coil 2 rests on a diagrammatically illustrated valve seat 25 of a valve bottom part 36, also shown only diagrammatically. When the coil 2 is energized, that is to say, is supplied with electrical energy, a magnetic field develops and exerts a force on the armature 3 so that the armature is drawn in the direction of the core head 6. The valve formed by the closure member 24 and the valve seat 25 is thereby opened. The air gap 37 formed in the state of rest between the cover disc 9 and the armature 3 then disappears.

The yoke 5 is formed by two semi-cylindrical shells 14, 15 which at their two axial ends have part end faces 16, 17. The yoke is formed from thin dynamo sheet or from several layers of thin dynamo sheet that are isolated electrically from one another. It can be made from a blank 18 that is in the form of a plate. Axial cuts 19 are made at its axial ends, so that a series of border region elements 20 are created. To make the directions clear, arrows for the circumferential direction 26 and for the axial direction 27 are given. After producing the border region elements 20, which may equally have been formed by punching, the border region elements are rotated out of the plane of the plate-like blank 18 (FIG. 4b) and then bent downwards along the bending lines 21 (FIG. 4c). The bending lines 21 run at a predetermined angle to the circumferential direction 26, so that the individual border region portions 20 no longer lie in the same plane but in a series of parallel planes that are inclined to the plane which together with the plane of the blank 18 forms a straight line that extends in the circumferential direction 26. The angle of the bending line 21 is selected so that the start of the bending line of a border region element is displaced with respect to the end of the bending line of an adjacent border region element by an amount that corresponds to the thickness of the material of the blank 18. As the blank is bent (FIG. 4d), the individual border region elements 20 then slide freely over one another. The bending process is not affected by snagging or catching. In the radial center of the end faces 16, 17 there is therefore a thickening of material, as especially apparent from FIG. 2. Since at these areas the magnetic field is at its strongest, however, this thickened area of material is desirable in order to make available to the magnetic field as large a transmission cross-section as possible. After the bending operation, the end faces are processed, that is, apertures 23 for the electrical connections 13 and for feeding through the armature tube 4 or the core head 6 are made. Moreover, pimple-like projections 34, which will later co-operate with the housing 8, can be pressed out. When the two semi-cylindrical shells 14, 15 are put together, they surround the coil 2 completely with the exception of air gaps 22, which extend in the axial direction between the two semi-cylindrical shells 14, 15. Since these air gaps 22 extend substantially in the direction of the main direction of the magnetic field, however, they do not disrupt the propagation of the magnetic field, that is to say, they increase the magnetic resistance to the magnetic flux hardly at all. A relatively easy assembly is nonetheless possible with such a configuration. The two semi-cylindrical shells 14, 15 are held together by the housing 8 which is pushed in the manner of a cup over the yoke 5 positioned around the coil. The projections 34 improve the binding force between the yoke 5 and the housing 8. They enable the yoke 5 to be positioned very close to the armature tube 4 and the core head 6, so that here too no air gaps or only very small air gaps are formed. Tolerances can be accommodated well in this manner.

The housing 8 is screwed with an external thread 31 into an internal thread 30 of a base part 28. An O-ring 29 is provided to form a seal between the housing 8 and the base part 28.

The closure member 24 on the armature 3 comprises a circular ring 32 of a resilient material, for example, spring steel, to which a tongue 33 that projects inwards in the circular ring 32 is fixed. This tongue lies on the valve seat 25 indicated diagrammatically in FIG. 6 when the valve top part 1 is in the position illustrated in FIG. 1.

As valves of this kind are opened, it is occasionally a problem that owing to a vacuum in the line to be opened the valve is held in the closed position. The magnetic arrangement then has to exert quite high forces on the armature in order to move it at all. In the position of the armature 3 illustrated in FIG. 1, in which the air gap 37 is large, the magnetic force is unfortunately at its lowest, so that the magnetic arrangement has to be of really large dimensions in order to be able to overcome this problem reliably. With the closure member 24 illustrated in FIG. 6 this problem is largely avoided. The tongue 33 is mounted resiliently on the circular ring 32. The circular ring 32 is crimped to the end of the armature 3, that is to say, it can be moved by the armature 3 in an axial direction. When the armature now moves in the axial direction, in FIG. 1 upwards, the tongue 33 is able initially to remain on the valve seat 25. With increasing movement the armature 3 first of all increases its momentum, that is to say, it absorbs a kinetic energy and, secondly, the magnetic force acting on the armature 3 becomes even larger on account of the diminishing air gap 37. After a certain movement, the force acting on the tongue 33 is greater than the retention force produced by the suction effect. The tongue 33 is then lifted at one end away from the valve seat 25. The pressure differences existing between the inlet and outlet side of the valve can hereby be equalized. The tongue is then able to lift completely away from the valve seat and the valve is opened.

Electromagnetic valves top parts 1 of that kind are needed for various performance categories. For example, the demands to be made on the opening and closing forces can be different for individual application purposes. The electromagnetic valve top part 1 illustrated is of modular construction for that reason. One module consists essentially of the base part and the armature tube 4 with cover disc 9 and armature 3, the armature tube 4 being fixedly connected to the base part 28. This module is of the same construction for all performance categories, that is, the armature 3 and the armature tube 4 have a predetermined standard length. This module can therefore be manufactured in large numbers.

The second module consists essentially of the coil 2, the shaped body 12, the yoke 5, the core head 6, the housing 8 and the terminal plate 7. The terminal plate 7 is in this case also identical for all performance categories. The modules for different performance categories differ only in the axial length of the coil 2. Of course, the coil body 12, the housing 8 and the yoke 5 have to be correspondingly adapted.

The adaptation is, however, here restricted to a change in the axial length. Since the electrical connection 13 are guided through the terminal plate 7, which is identical for all performance categories, the site of the electrical connections is also identical for all performance categories. The axial length of the core head 6 also changes with the axial length of the coil. The core head projects in each case sufficiently far into the coil 2 for there to be always a constant space available for the armature tube 4. The effect of this is that the air gap 37 is substantially the same for all performance categories.

The axial lengthening or shortening can be carried out without difficulty. This also applies to the yoke 5. To produce a longer or shorter yoke, a correspondingly longer or shorter blank 18 simply needs to be used. The other production steps remain the same. Consequently, the same tools can also be used.

Because the radial dimensions of all parts are (the same)[3] for all performance categories, the tools required to produce these radial dimensions can be exploited effectively. For that reason, tools that operate more precisely can be used, without the cost of manufacture having to be increased to excessive levels. This also enables the radial dimensions to be produced more accurately so that, for example, it is possible to make the yoke 5 lie very close to the core head 6 and the armature tube 4. That forms a magnetic path for the magnetic field without noticeable parasitic air gaps. The electrical and magnetic energy can therefore be effectively exploited here. With the same overall size, higher opening and closing forces

[3] Words in brackets added for clarity - translator.

can be achieved, or, with otherwise identical performances, the overall size can be reduced. The efficiency of such an electromagnetic valve top part is greater. It is easy to see that the use of a construction of that kind provides extreme flexibility in respect of the fabrication of such electromagnetic top parts for individual performance categories. To select a higher or lower performance category, one merely uses a longer or shorter module.

Because all parts are essentially cylindrical or at least constructed to be rotationally symmetrical, they lend themselves very well to stacking and can be fed to an automatic production apparatus which takes over the assembly of the parts. With different axial dimensions of the electromagnetic valve top part for different performance categories, this apparatus also needs to be designed only for different axial movements of a tool. The radial dimensions remain the same overall.

The cover disc 9 is movable prior to assembly in the armature tube 4. A calibration can be effected, for example, in that the armature 3 and the armature tube 4 are inserted into the base part 28. The armature 3 is then pressed mechanically downwards to its end position. The cover disc 9 can now be inserted in the armature tube 4 and caused to engage the top side of the armature. Finally, the cover disc is retracted by a defined distance, for instance 2 Mm. This distance can be adhered to for all valves with sufficient accuracy, so that it thereby possible to even out tolerances. After that, the cover disc 9 is fixed from the outside in the armature tube 4, for example by laser welding. The magnetic system can now be mounted, the cover disc 9 lying flat against the core head 6.

We claim:

1. An electromagnetic valve assembly, comprising,
   a valve seat,
   a coil arrangement including a coil unit defining a central bore and a yoke unit attached to and surrounding said coil unit,
   a base unit attachable to said coil arrangement,
   said base unit having a bore of the same diameter as said coil unit central bore and in axial alignment therewith,
   an armature tube fixedly disposed in said coil unit and base unit bores,
   a core head fixedly disposed in said coil unit bore in axially adjacent and abutting relation to said armature tube, and
   an armature slidably disposed in said armature tube having one end thereof cooperable with said core head to form an air gap and having closure means at the other end thereof cooperable with said valve seat, said electromagnetic valve assembly being assembled from two modules wherein (1) a first module comprises said base unit, said armature and said armature tube and (2) a second module comprises said coil arrangement, said yoke and said core head.

2. An electromagnetic valve assembly according to claim 1 wherein a terminal plate is attached to the end of said yoke unit remote from said valve seat and to said core head, said terminal plate having openings for the passage of electrical connections for said coil arrangement, a housing shell surrounding said terminal plate and said yoke unit, and small projections formed on said yoke unit to provide a press fit for said housing shell relative to said yoke unit.

* * * * *